United States Patent
Ruiz Lara

(10) Patent No.: US 12,134,472 B2
(45) Date of Patent: Nov. 5, 2024

(54) SYSTEM INCLUDING STOWABLE TABLET HOLDER APPARATUS

(71) Applicant: B/E Aerospace, Inc., Winston-Salem, NC (US)

(72) Inventor: Oscar Ruiz Lara, Kirkland, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 47 days.

(21) Appl. No.: 18/122,974

(22) Filed: Mar. 17, 2023

(65) Prior Publication Data
US 2024/0308663 A1    Sep. 19, 2024

(51) Int. Cl.
B64D 11/00    (2006.01)

(52) U.S. Cl.
CPC .. B64D 11/00152 (2014.12); B64D 11/00155 (2014.12)

(58) Field of Classification Search
CPC ................ B64D 11/00152; B64D 11/00155
See application file for complete search history.

(56) References Cited

U.S. PATENT DOCUMENTS

| 8,936,307 | B2 | 1/2015 | Heredia |
| 9,796,344 | B2 * | 10/2017 | Pajic ........................ A47B 23/00 |
| 9,908,624 | B2 | 3/2018 | Terleski et al. |
| 10,562,635 | B2 | 2/2020 | Colletti |
| 10,793,081 | B2 | 10/2020 | Han et al. |
| D908,709 | S * | 1/2021 | Fine ............................ D14/447 |
| 2002/0085672 | A1 | 7/2002 | Ganin et al. |
| 2015/0108798 | A1 | 4/2015 | Boyer, Jr. |
| 2018/0118343 | A1 * | 5/2018 | Castaing .......... B64D 11/00152 |
| 2018/0334261 | A1 | 11/2018 | Longo |
| 2019/0061954 | A1 * | 2/2019 | Miedema ................ A47B 3/00 |
| 2022/0234739 | A1 | 7/2022 | Morales et al. |

FOREIGN PATENT DOCUMENTS

| AU | 1999049196 A1 | 2/2000 |
| CA | 2906681 A1 | 3/2017 |
| EP | 2949515 A1 | 12/2015 |
| EP | 3594067 A1 | 1/2020 |
| EP | 2917106 B1 | 10/2020 |
| GB | 2563211 A | 12/2018 |
| WO | 2002085672 A1 | 10/2002 |

* cited by examiner

*Primary Examiner* — Valentina Xavier
(74) *Attorney, Agent, or Firm* — Suiter Swantz IP

(57) ABSTRACT

A system includes a structure and a stowable tablet holder apparatus. The stowable tablet holder apparatus may include a pivotable support arm and a base member. The base member may have a rear portion and a front lip portion. The base member may be horizontally positioned when in a stowed state and when in a deployed state. The pivotable support arm may extend from the front of the rear portion toward the front lip portion when in the stowed state. When the base member is in the deployed state, the stowable tablet holder apparatus may be configured to hold a tablet at a viewing angle by rotation of the pivotable support arm such that a bottom edge of the tablet rests against the front lip portion and a back of the tablet rests against the pivotable support arm.

18 Claims, 15 Drawing Sheets

SYSTEM INCLUDING STOWABLE TABLET HOLDER APPARATUS

BACKGROUND

Use of personal electronic devices, such as tablets, by airplane passengers is a growing trend. Passengers prepare for flights by downloading content from streaming platforms and they expect to be able to enjoy this content during their flight, therefore they expect the seat to have an area where tablets or smartphones can be secured while viewing content.

Current business class seat products incorporate tablet holders in the meal table; however, the height of meal tables is optimized for eating and may be too low to provide a comfortable viewing angle. Furthermore, the height of some meal tables makes them unsuitable for being used when the seat is in a recline or deep recline position, so a passenger is not able to watch content on their devices comfortably while in a reclined position.

SUMMARY

In one aspect, embodiments of the inventive concepts disclosed herein are directed to a system. The system includes a structure and a stowable tablet holder apparatus installed in an aircraft. The stowable tablet holder apparatus may include a pivotable support arm and a base member. The base member may have a rear portion and a front lip portion. The base member may be horizontally positioned when in a stowed state and when in a deployed state. The base member may horizontally stow within the structure in the stowed state. The base member may at least partially extend horizontally from the structure in the deployed state such that the front lip portion and optionally part of the rear portion extend horizontally away from the structure. A front of the rear portion may be configured to connect to the pivotable support arm. The pivotable support arm may be connected to the front of the rear portion. The pivotable support arm may extend from the front of the rear portion toward the front lip portion when in the stowed state. When the base member is in the deployed state, the stowable tablet holder apparatus may be configured to hold a tablet at a viewing angle by rotation of the pivotable support arm such that a bottom edge of the tablet rests against the front lip portion and a back of the tablet rests against the pivotable support arm.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
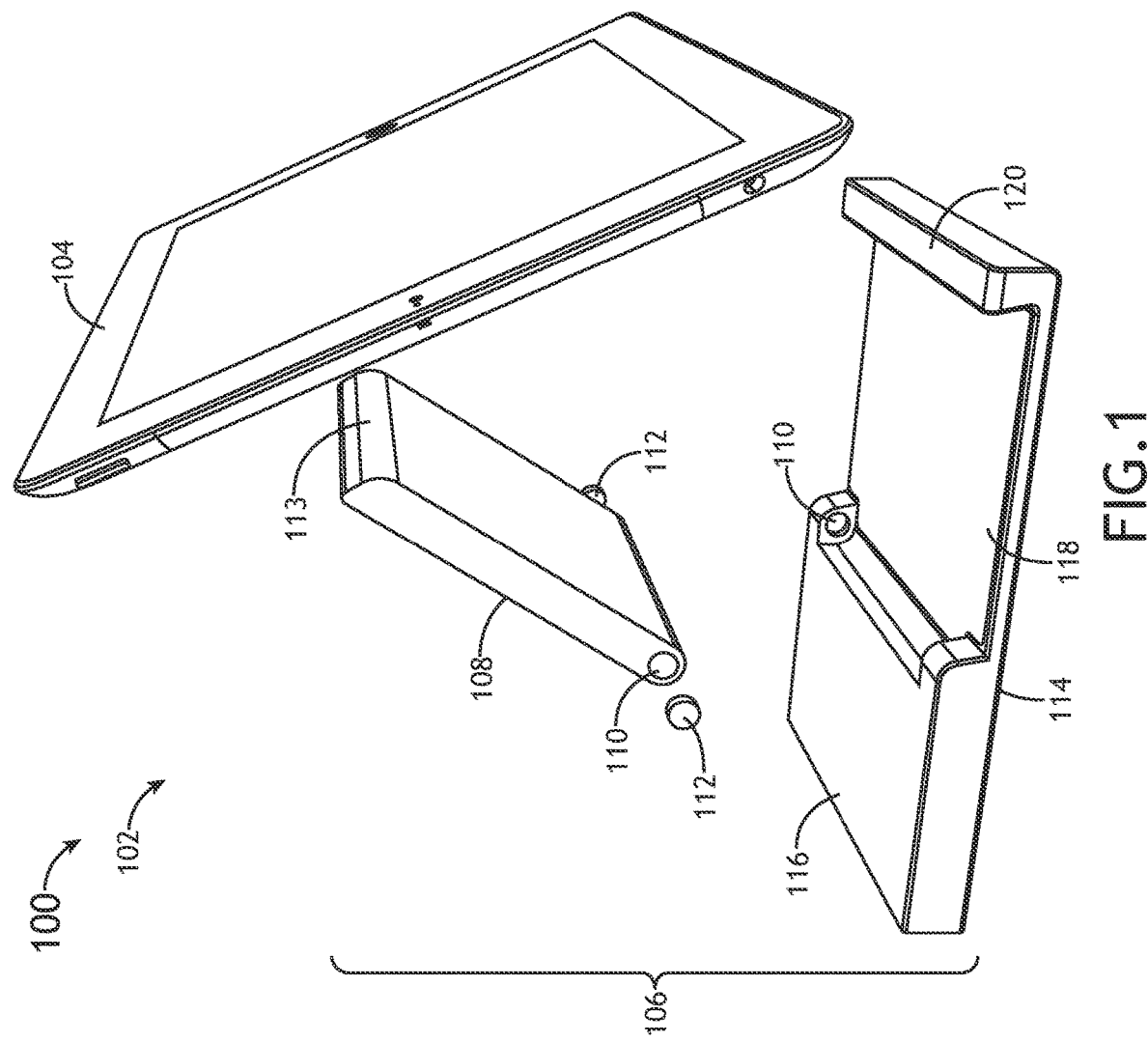
FIG. 1 is a view of an exemplary embodiment of a system including a vehicle including a tablet and an exploded view of a stowable tablet holder apparatus according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a stowable tablet holder apparatus. The system may be a non-vehicular system or may include a vehicle (e.g., aircraft, watercraft, automobile, train, etc.). The stowable tablet holder apparatus may be used in any suitable environment. In some embodiments, the stowable tablet holder apparatus can secure a tablet at a height that allows a comfortable viewing angle and can also be used while reclined or in a bed position.

In some embodiments, a stowable tablet holder apparatus can be stored horizontally in a structure (e.g., a wall or a business class seat furniture, such as in wall of the furniture under an in-flight entertainment (IFE) display). The stowable tablet holder apparatus may slide out towards the passenger to create a shelf where a tablet or smartphone can rest. A pivotable support arm can be deployed from this shelf to stop the tablet from falling and hold the tablet in place at a specific angle. This pivotable support arm may be held at different angles to adjust an orientation of the tablet and place the tablet at an optimal viewing angle for different sized passengers.

In some embodiments, the stowable tablet holder apparatus may allow passengers to secure their devices at a location that provides a comfortable viewing angle. In some embodiments, the stowable tablet holder apparatus may provide angle adjustment to allow different sized passengers to find their optimal viewing angle. Some embodiments may allow a tablet holder feature to be removed from the meal table, so passengers can use the meal table for a meal or store it away while still being able to enjoy their content on a tablet held in place by the stowable tablet holder apparatus. In some embodiments, the stowable tablet holder apparatus can be deployed and controlled using different means, so it can scale to the needs of different airlines.

Referring now to FIG. 1, an exemplary embodiment of a system 100 including a vehicle (e.g., aircraft 102, watercraft, automobile, train, etc.) including a tablet 104 and an exploded view of a stowable tablet holder apparatus 106 are depicted according to the inventive concepts. For example, the stowable tablet holder apparatus 106 may be installed in the aircraft 102. In some embodiments, the stowable tablet holder apparatus 106 may include a support arm (e.g., a pivotable support arm 108) and a base member 114.

For example, the base member 114 may have a rear portion 116, a front lip portion 120, and optionally a recessed portion 118. The base member 114 may be horizontally positioned when in a stowed state and when in a deployed state. The base member 114 may horizontally stow within a structure in the stowed state. For example, the base member 114 may at least partially extend horizontally from the structure in the deployed state such that the recessed portion 118, the front lip portion 120, and part of the rear portion 160 extend horizontally away from the structure. In some embodiments, a vertical thickness of the rear portion 116 is greater than a vertical thickness of the recessed portion 118. In some embodiments, a vertical thickness of the front lip portion 120 is greater than a vertical thickness of the recessed portion 118. A front of the rear portion 116 may be configured to connect to the pivotable support arm 108.

For example, the pivotable support arm 108 may be connected to the front of the rear portion 116 via at least one friction hinge 110, such as via pins 112. In some embodiments, each of the at least one friction hinge 110 has a pin 112 connecting the pivotable support arm 108 to the rear portion 114. The pivotable support arm 108 may abut the recessed portion 118 when the base member 114 is in the stowed state. The pivotable support arm 108 may extend from the front of the rear portion 116 toward the front lip portion 120 when in the stowed state. The pivotable support arm 108 may be configured to pivot about a horizontal axis (e.g., extending between the pins 112) via the at least one friction hinge 110 such that the pivotable support arm 108 has a range of motion between a horizontal position abutting the recessed portion 118 and a terminal rotation position (e.g., a maximum amount of rotation away from the recessed portion 118). The pivotable support arm 108 may have a curved front surface 113. The pivotable support arm 108 may extend from the front of the rear portion 116 toward the curved front surface 113. In some embodiments, when the base member 114 is horizontally positioned in the stowed state, a bottom edge of the curved front surface 113 may be closer to the rear portion 116 than a top edge of the curved front surface 113. In some embodiments, an angle between a top surface of the recessed portion 118 and a rear surface of the front lip portion 120 may be acute to accommodate a bottom edge of a tilted tablet 104.

When the base member 114 is in the deployed state, the stowable tablet holder apparatus 106 may be configured to hold a tablet 104 at any of various viewing angles by rotation of the pivotable support arm to a desired position such that a bottom edge of the tablet 104 rests on the recessed portion 118 and against the front lip portion 120 and a back of the tablet rests against a portion of the curved front surface 113 of the pivotable support arm 108. In some embodiments, the pivotable support arm 108 has at least a 90-degree range of motion. In some embodiments, the pivotable support arm 108 has at least a 100-degree range of motion. In some embodiments, the pivotable support arm 108 has less than a 90-degree range of motion.

In some embodiments, when the pivotable support arm 108 abuts the recessed portion 118, a top surface of the pivotable support arm 108 may be flat and a bottom surface of the pivotable support arm 108 may be flat. In some embodiments, a bottom surface of the base member 114 may be flat.

Figure 2:
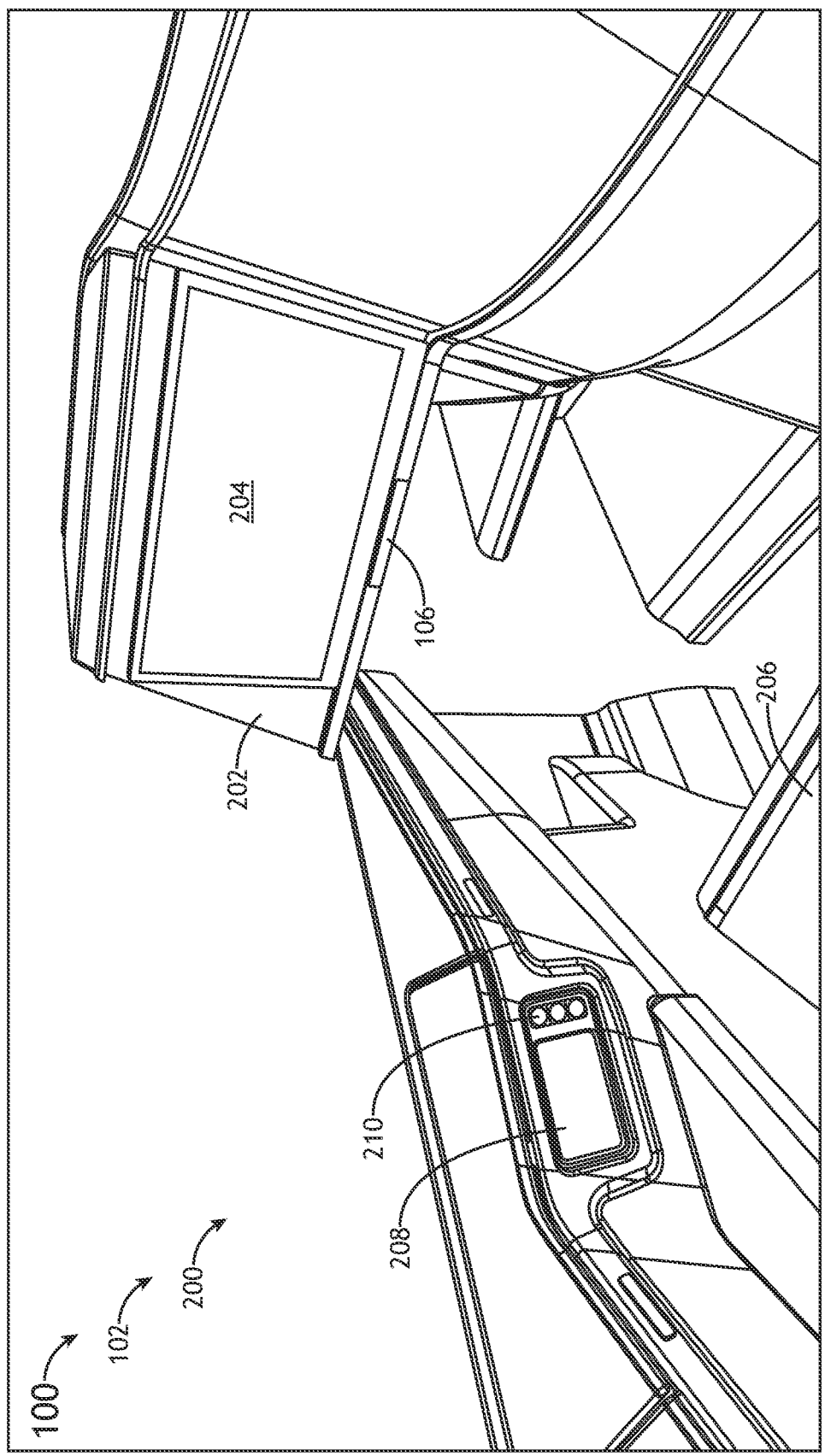
FIGS. 2-10 are views of an exemplary embodiment of the system of FIG. 1 according to the inventive concepts disclosed herein.

Referring now to FIG. 2, an exemplary embodiment of the system 100 of FIG. 1 is shown. For example, the aircraft 102 may include a passenger suite 200. The passenger suite 102 may include a structure (e.g., a wall 202 of the passenger suite 200), an in-flight entertainment 204 display (e.g., installed on the wall 202), the stowable tablet holder apparatus 106 installed in the structure (e.g., the wall 202), a passenger seat 206, and/or a user interface system (e.g., a touchscreen display 208 and/or buttons 210), some or all of which may be communicatively coupled at any given time. As shown in FIG. 2, the base member 114 of the stowable tablet holder apparatus 106 is positioned in a stowed state, horizontally stowed within the structure. In some embodiments, the stowable tablet holder apparatus 106 may be installed below the IFE display 204, though in other embodiments, the stowable tablet holder apparatus 106 may be installed at any suitable location.

Figure 3:
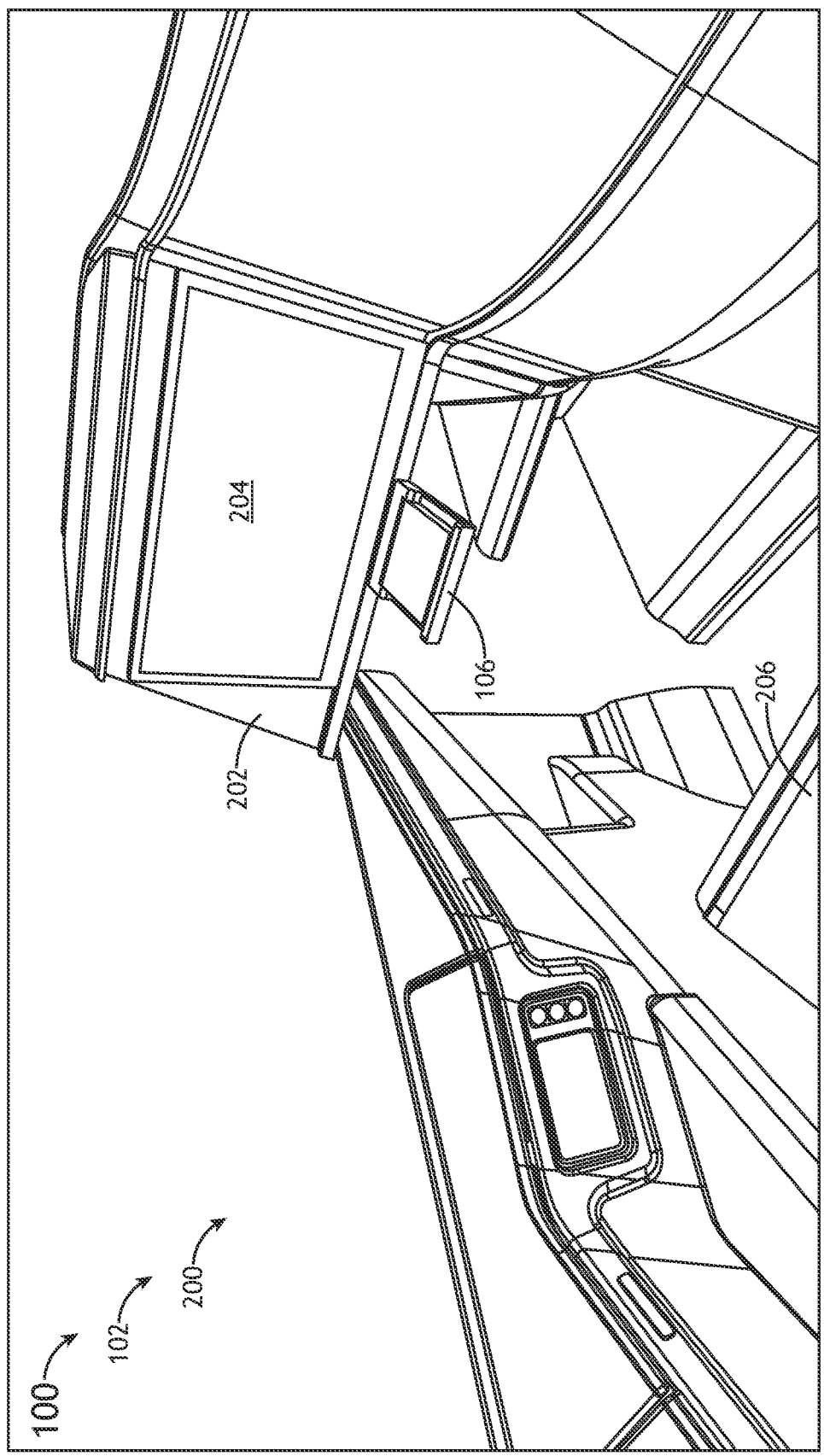

Referring now to FIG. 3, an exemplary embodiment of the system 100 of FIGS. 1-2 is shown. As shown in FIG. 3, the base member 114 of the stowable tablet holder apparatus 106 is positioned in a deployed state. The base member 114 may at least partially extends horizontally from the structure in the deployed state such that the recessed portion 118, the front lip portion 120, and part of the rear portion 116 extend horizontally away from the structure (e.g., the wall 202).

Figure 4:
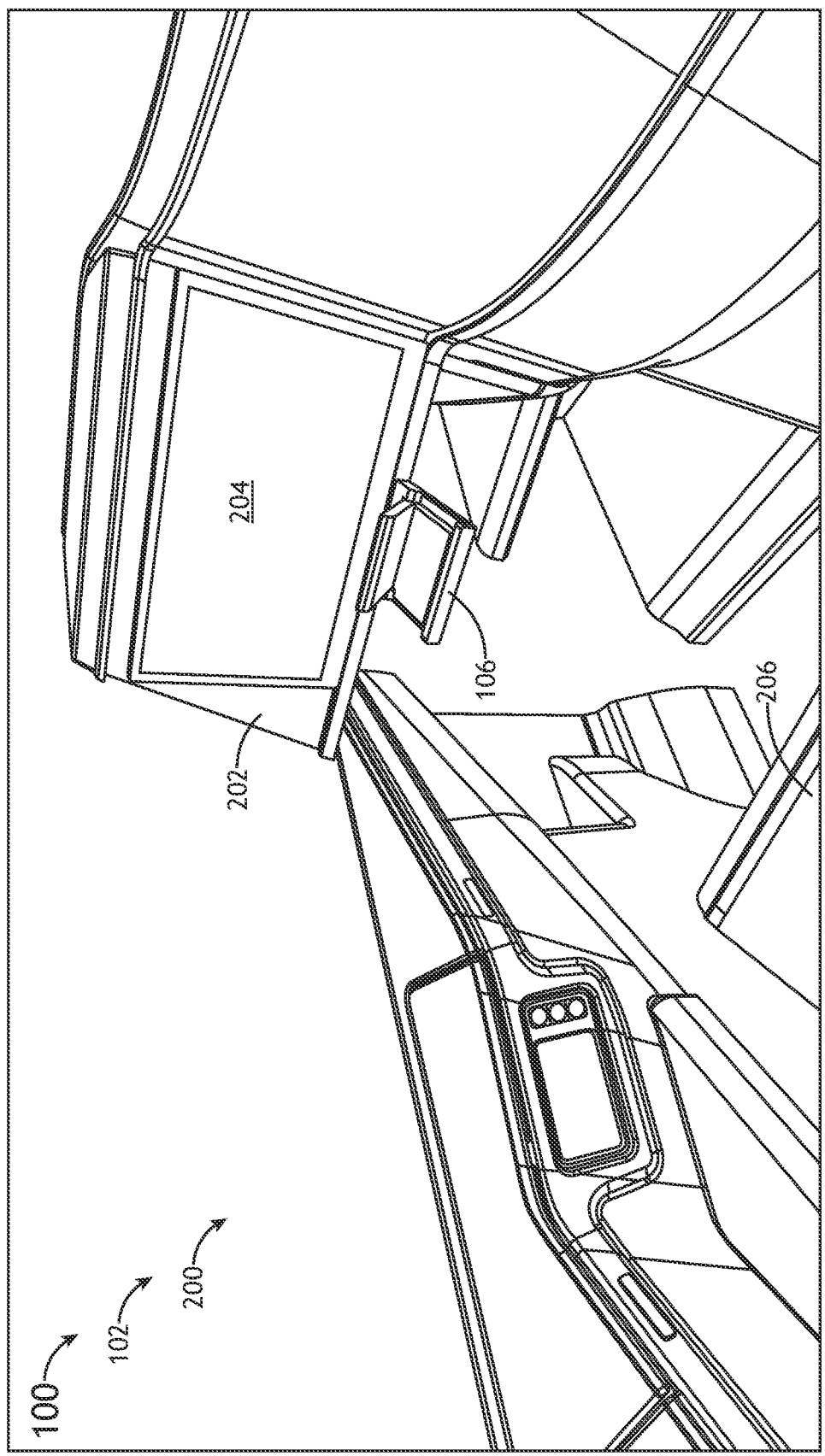

Referring now to FIG. 4, an exemplary embodiment of the system 100 of FIGS. 1-3 is shown. As shown in FIG. 4, the base member 114 of the stowable tablet holder apparatus 106 is positioned in a deployed state, and the pivotable support arm 108 may be configured to pivot about a horizontal axis (e.g., extending between the pins 112) via the at least one friction hinge 110 such that the pivotable support arm 108 has a range of motion between a horizontal position abutting the recessed portion 118 and a terminal rotation position (e.g., a maximum amount of rotation away from the recessed portion 118).

Figure 5:
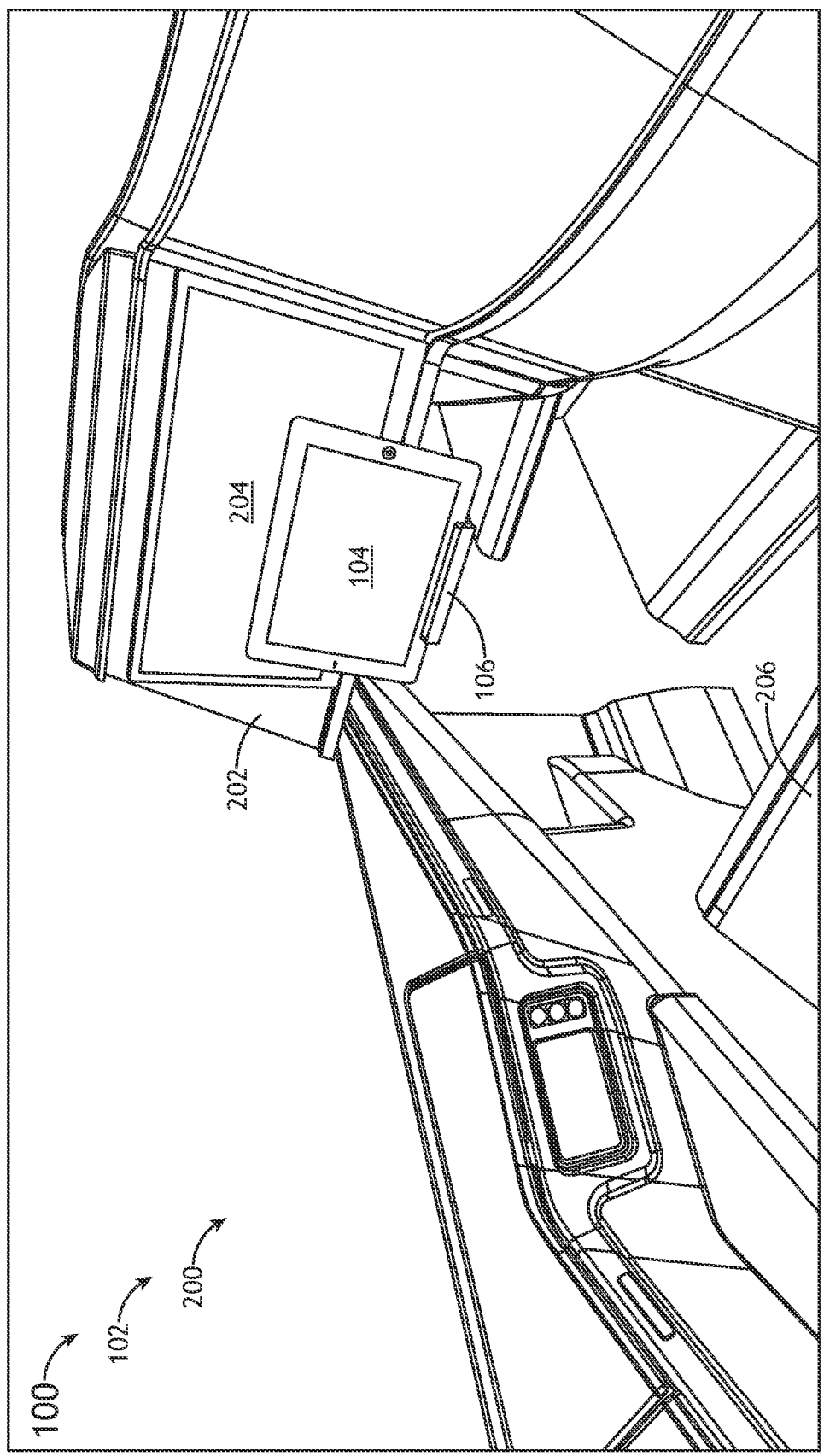

Referring now to FIG. 5, an exemplary embodiment of the system 100 of FIGS. 1-4 is shown. As shown in FIG. 5, the base member 114 of the stowable tablet holder apparatus 106 is positioned in a deployed state. When the base member 114 is in the deployed state, the stowable tablet holder apparatus 106 may be configured to hold a tablet 104 at any of various viewing angles by rotation of the pivotable support arm to a desired position such that a bottom edge of the tablet 104 rests on the recessed portion 118 and against the front lip portion 120 and a back of the tablet rests against a portion of the curved front surface 113 of the pivotable support arm 108.

Figure 6:
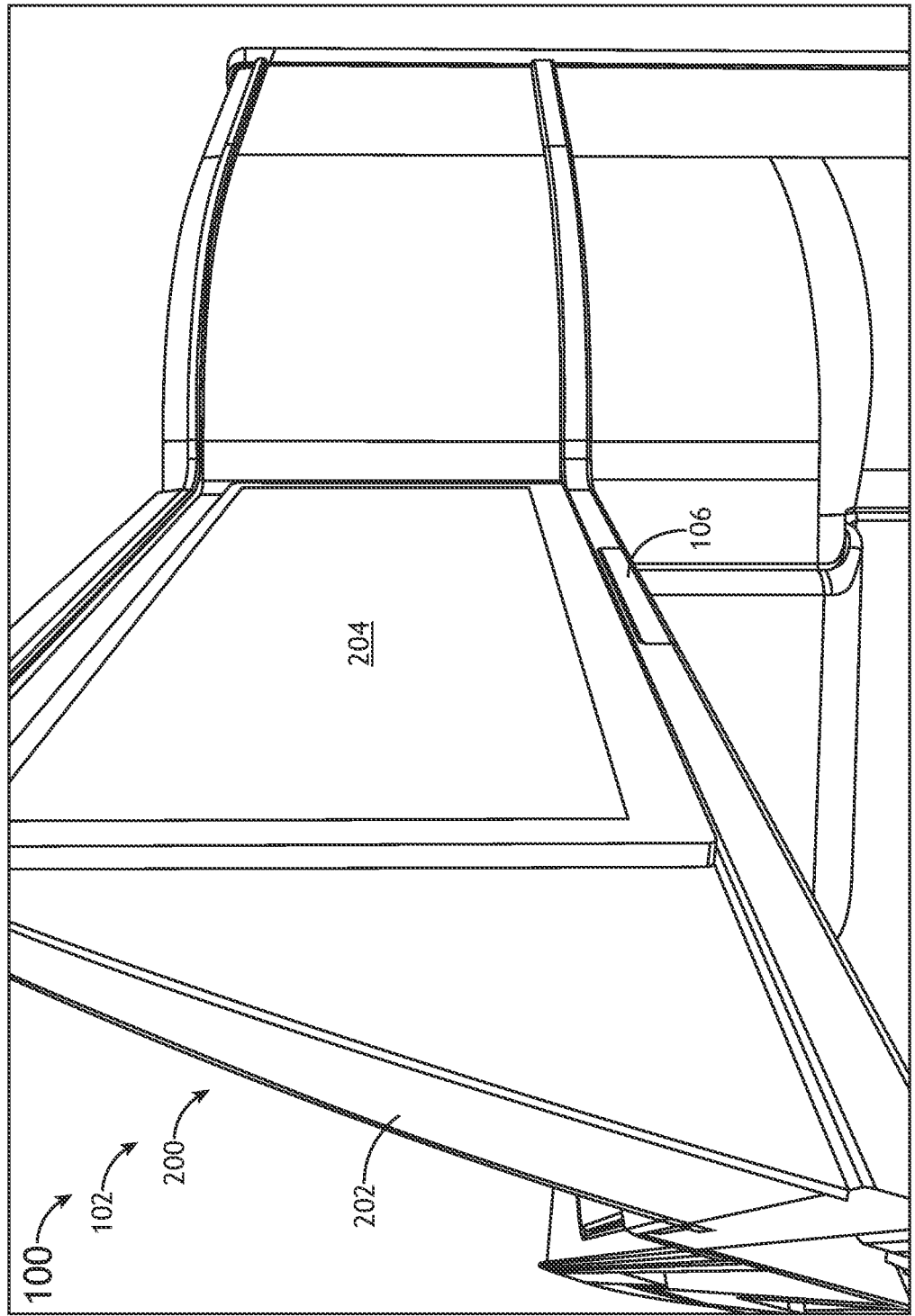

Referring now to FIG. 6, an exemplary embodiment of the system 100 of FIGS. 1-5 is shown. As shown in FIG. 6, the base member 114 of the stowable tablet holder apparatus 106 is positioned in a stowed state, horizontally stowed within the structure.

Figure 7:
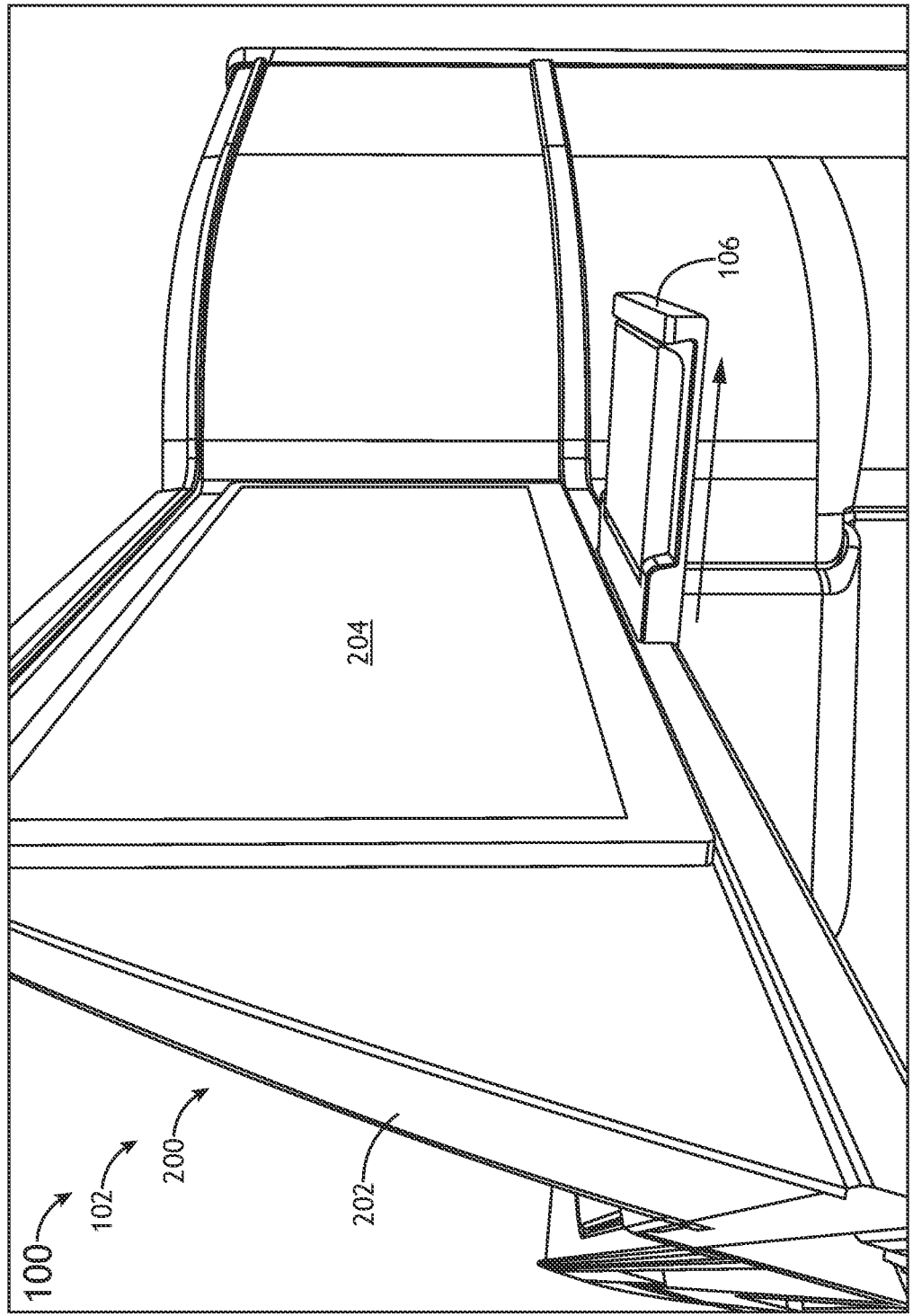

Referring now to FIG. 7, an exemplary embodiment of the system 100 of FIGS. 1-6 is shown. As shown in FIG. 7, the base member 114 of the stowable tablet holder apparatus 106 is positioned in a deployed state.

Figure 8:
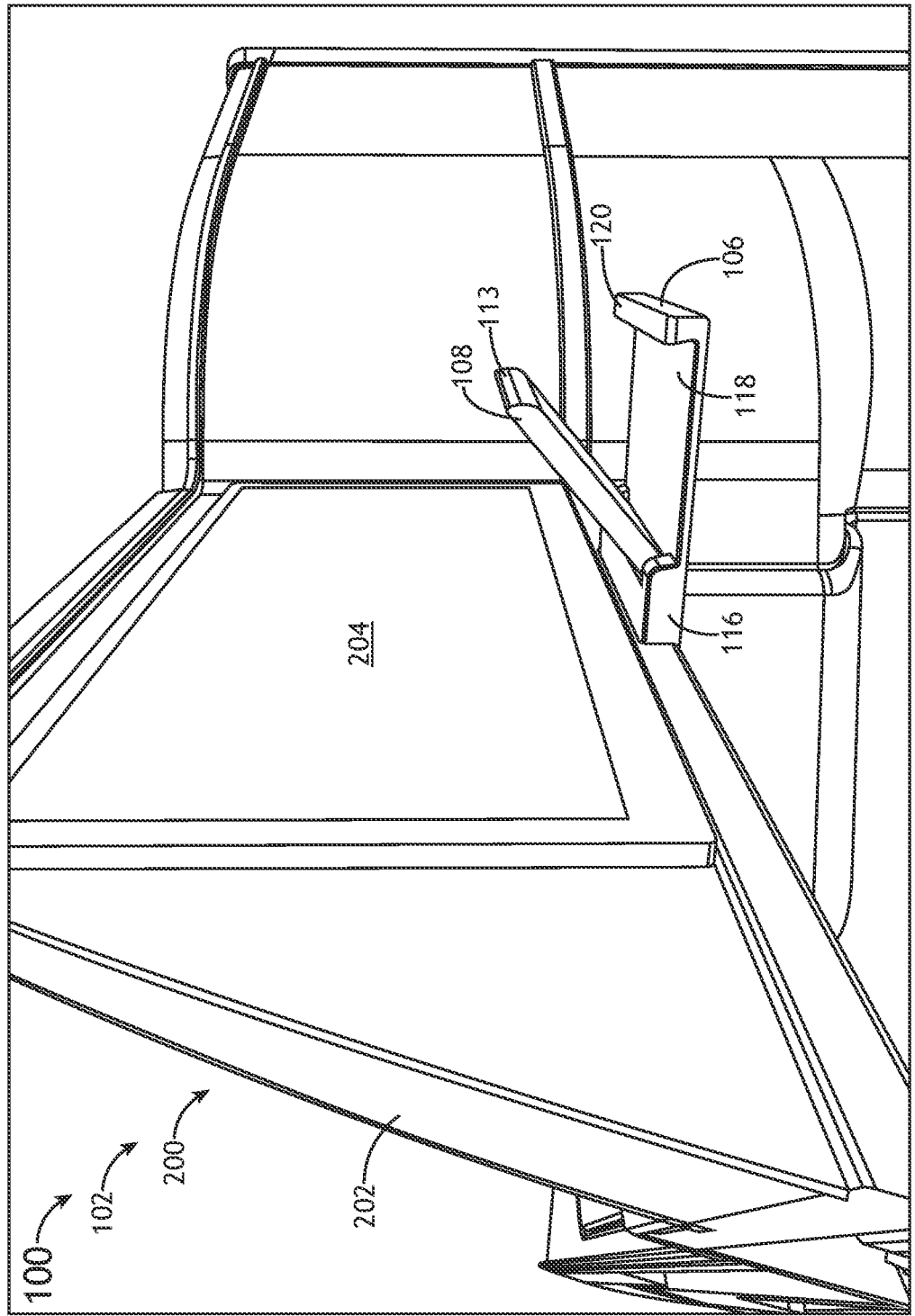
Figure 9:
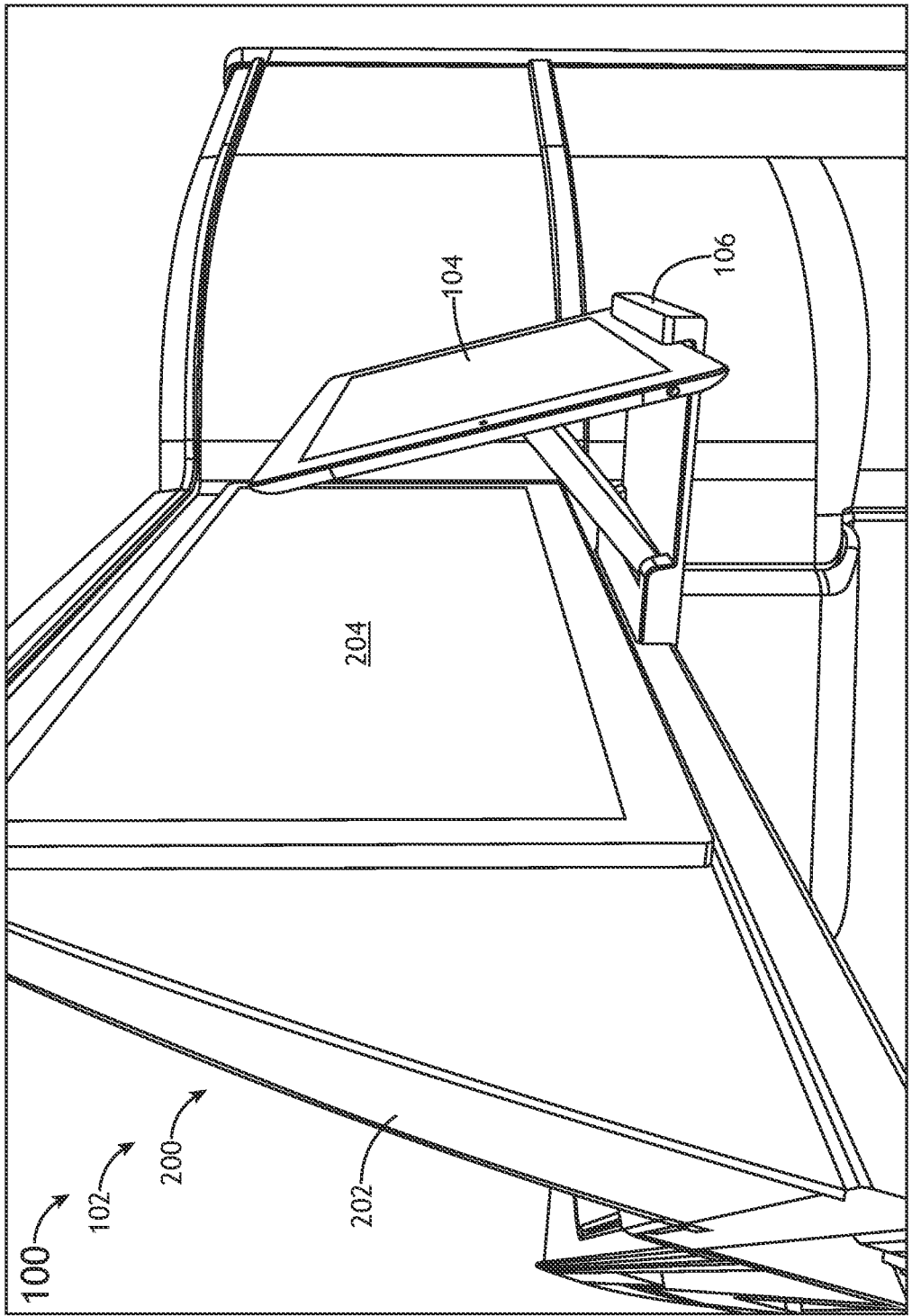
Figure 10:
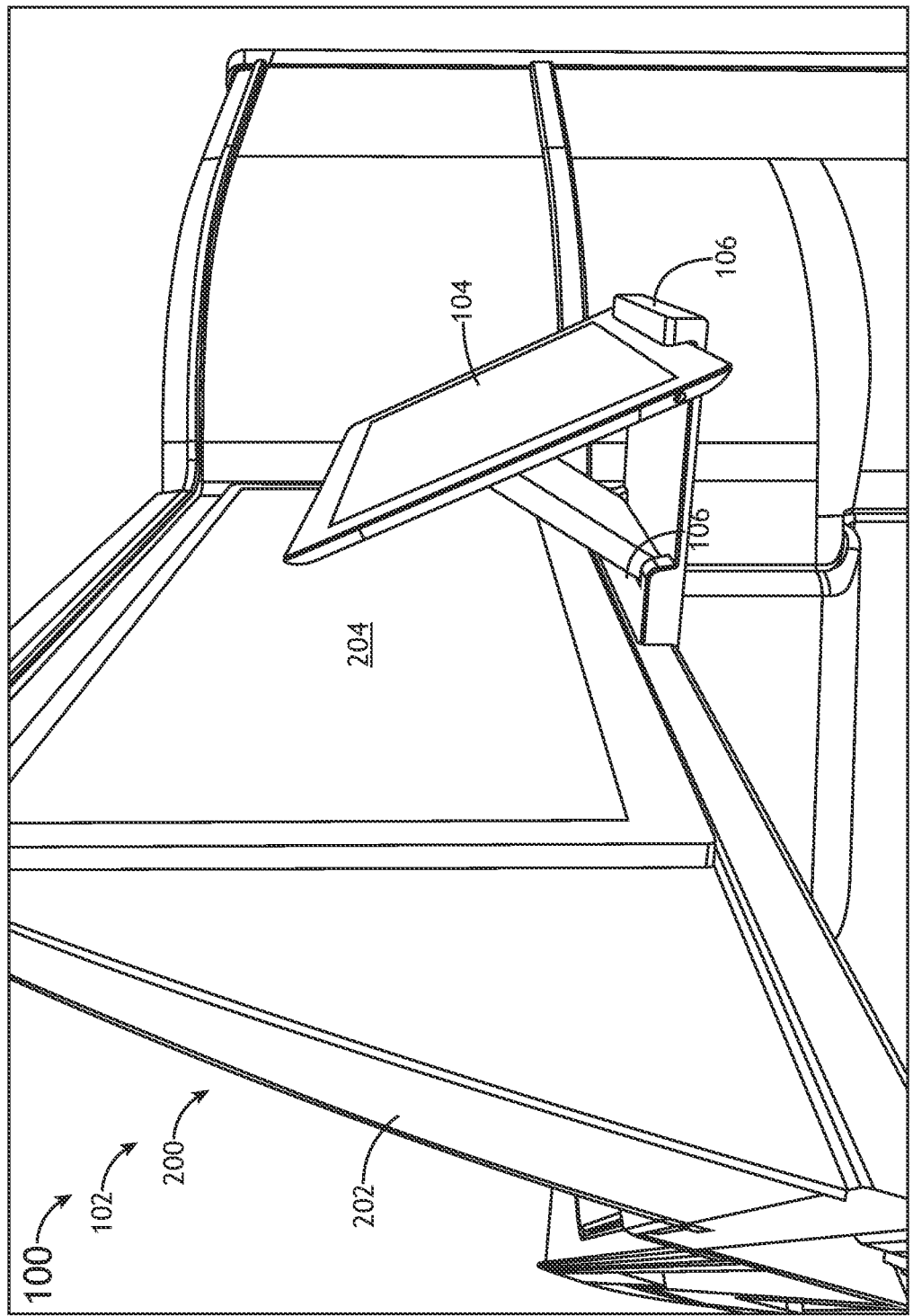

Referring now to FIGS. 8-10, an exemplary embodiment of the system 100 of FIGS. 1-7 is shown. As shown in FIGS. 8-10, the base member 114 of the stowable tablet holder apparatus 106 is positioned in a deployed state. When the base member 114 is in the deployed state, the stowable tablet holder apparatus 106 may be configured to hold a tablet 104 at any of various viewing angles by rotation of the pivotable support arm 108 to a desired position such that a bottom edge of the tablet 104 rests on the recessed portion 118 and against the front lip portion 120 and a back of the tablet rests against a portion of the curved front surface 113 of the pivotable support arm 108.

Figure 11:
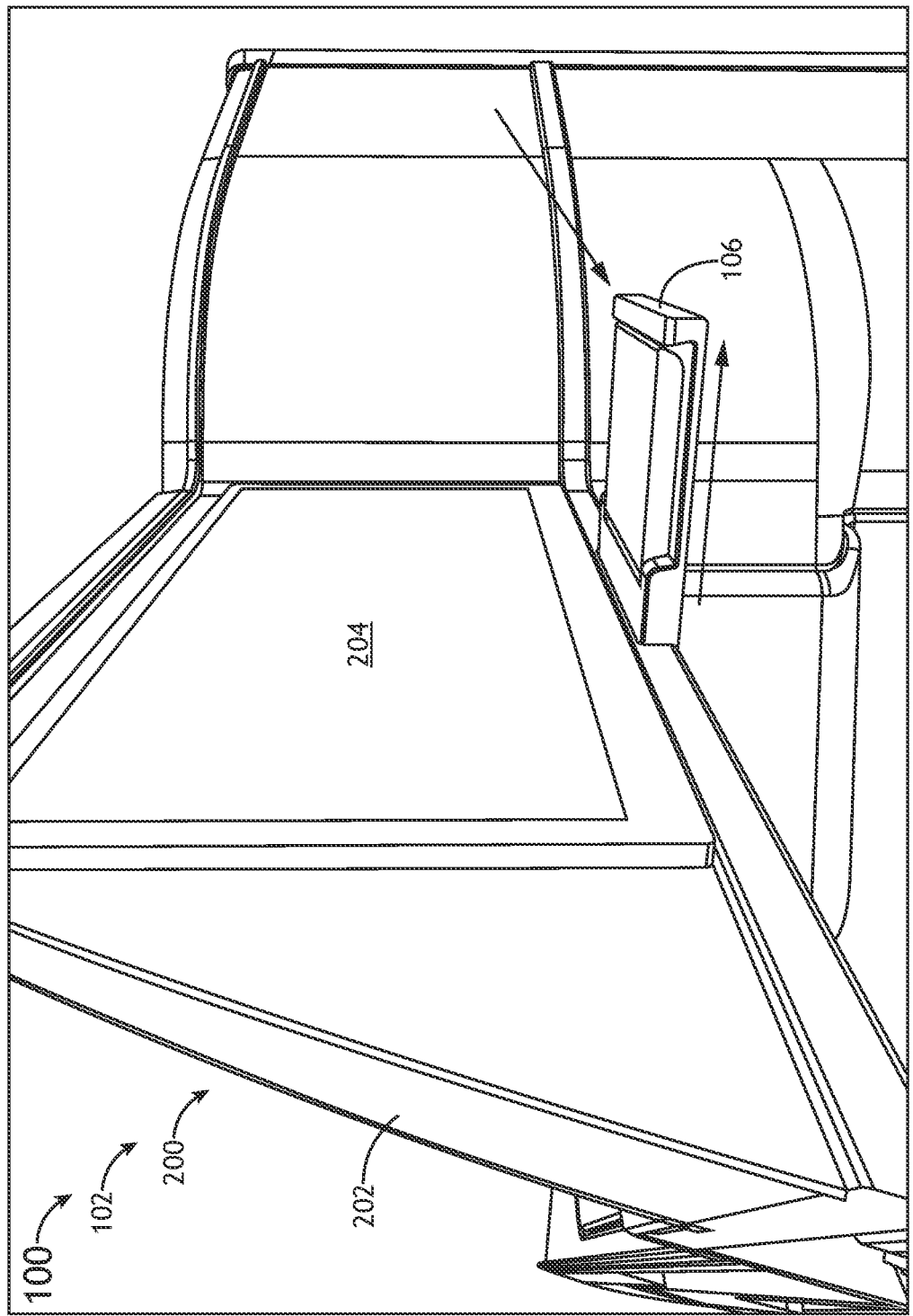
FIG. 11 is a view of an exemplary embodiment of the system of FIGS. 1-10 according to the inventive concepts disclosed herein.
Figure 12A:
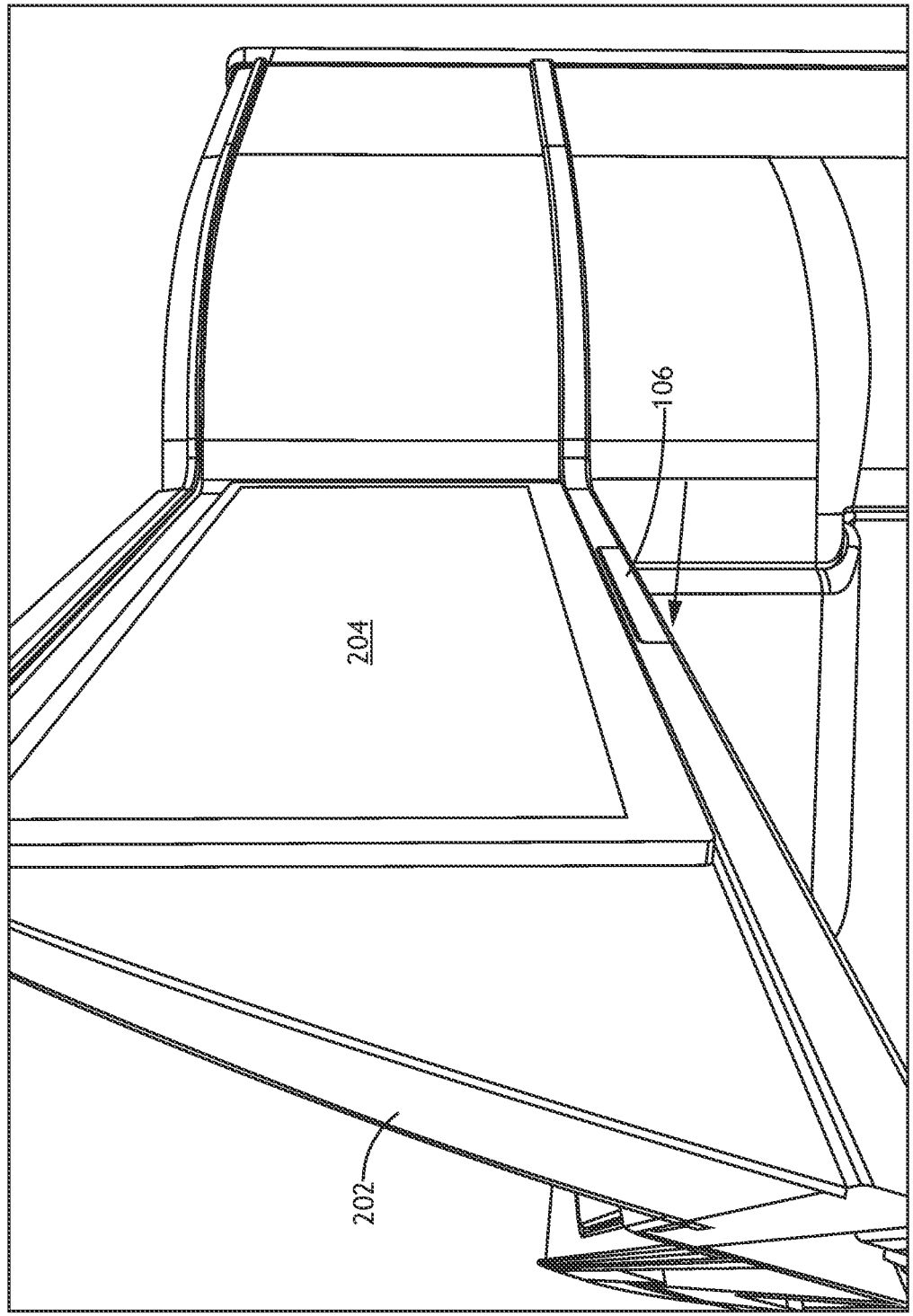
FIGS. 12A and 12B are views of an exemplary embodiment of the system of FIGS. 1-10 according to the inventive concepts disclosed herein.
Figure 12B:
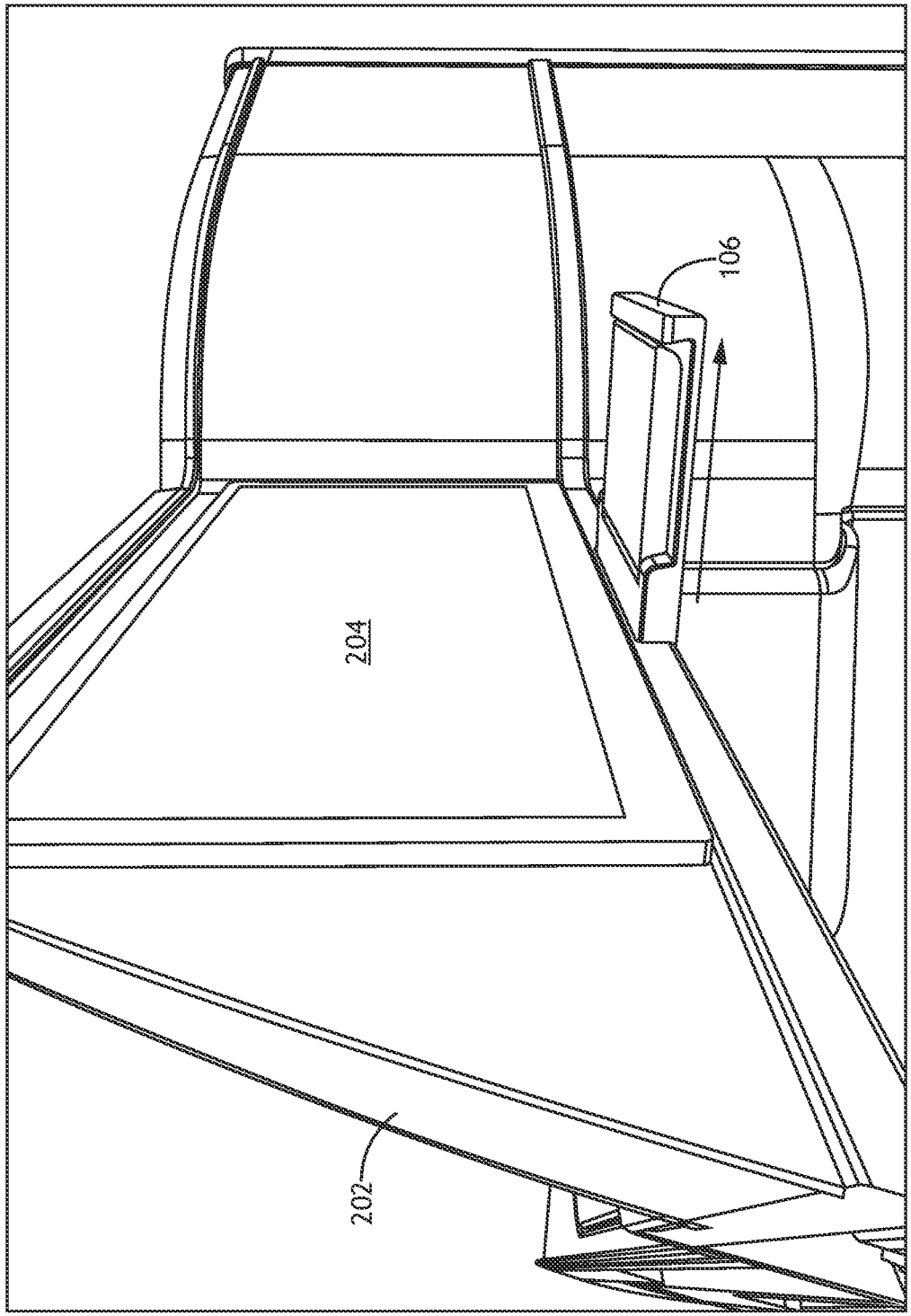

Referring now to FIGS. 11, 12A, and 12B, an exemplary embodiment of the system 100 of FIGS. 1-10 is shown. As shown in FIGS. 11, 12A, and 12B, the stowable tablet holder apparatus 106 may include a push-to-deploy mechanism, which for example may include a spring and a latch. For example, the stowable tablet holder apparatus 106 may be manually deployable and stowable. For example, the stowable tablet holder apparatus 106 may be manually deployable and stowable by a pressing against a front of the front lip portion 120. In some embodiments, the stowable tablet holder apparatus 106 may be manually deployable and stowable by a pulling a front of the front lip portion 120.

Figure 13A:
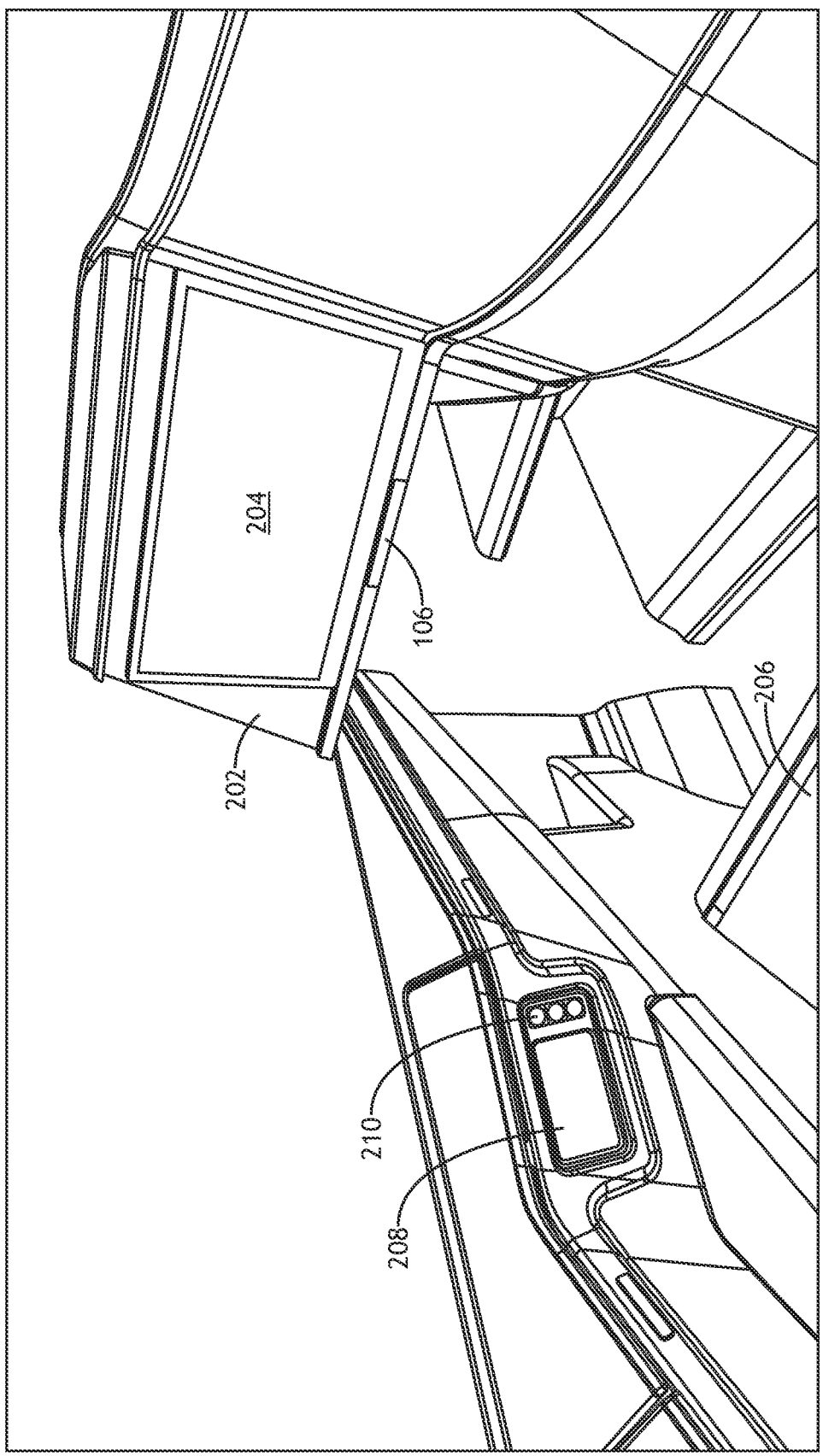
FIGS. 13A and 13B are views of an exemplary embodiment of the system of FIGS. 1-10 according to the inventive concepts disclosed herein.
Figure 13B:
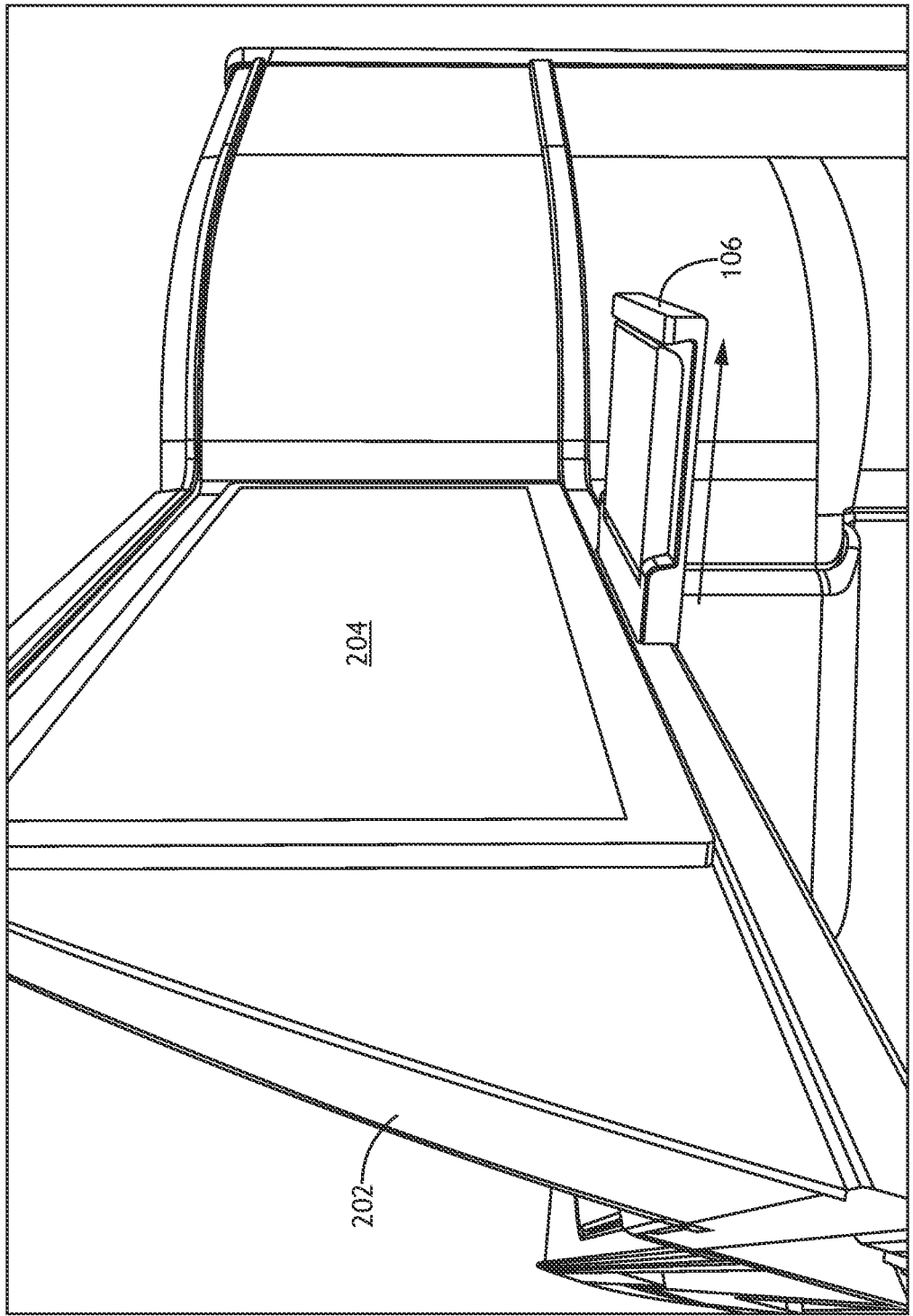

Referring now to FIGS. 13A and 13B, an exemplary embodiment of the system 100 of FIGS. 1-10 is shown. As shown in FIGS. 13A and 13B, the stowable tablet holder apparatus 106 may be motorized to move the base member 114 between the stowed state and the deployed state. For example, a passenger 1202 may interface with the user interface system (e.g., which may include at least one button 210 and/or a touchscreen display 208) configured to activate a motorized action of the stowable tablet holder apparatus 106 to move between the stowed state and the deployed state.

As will be appreciated from the above, embodiments of the inventive concepts disclosed herein may be directed to a system including a stowable tablet holder apparatus.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a structure installed in an aircraft; and
a stowable tablet holder apparatus installed in the aircraft, comprising:
a pivotable support arm; and
a base member having a rear portion and a front lip portion, wherein the base member is horizontally positioned when in a stowed state and when in a deployed state, wherein the base member horizontally stows within the structure in the stowed state, wherein the base member at least partially extends horizontally from the structure in the deployed state such that the front lip portion and optionally part of the rear portion extend horizontally away from the structure, wherein a front of the rear portion is configured to connect to the pivotable support arm; and
wherein the pivotable support arm is connected to the front of the rear portion, wherein the pivotable support arm extends from the front of the rear portion toward the front lip portion when in the stowed state, wherein, when the base member is in the deployed state, the stowable tablet holder apparatus is configured to hold a tablet at a viewing angle by rotation of the pivotable support arm such that a bottom edge of the tablet rests against the front lip portion and a back of the tablet rests against the pivotable support arm.

2. The system of claim 1, wherein the base member further has a recessed portion, wherein the base member at least partially extends horizontally from the structure in the deployed state such that the recessed portion, the front lip portion, and optionally part of the rear portion extend horizontally away from the structure, wherein a vertical thickness of the rear portion is greater than a vertical thickness of the recessed portion, wherein a vertical thickness of the front lip portion is greater than a vertical thickness of the recessed portion, wherein the pivotable support arm abuts the recessed portion when the base member is in the stowed state.

3. The system of claim 2, wherein the pivotable support arm is connected to the front of the rear portion via at least one friction hinge, wherein the pivotable support arm is configured to pivot about a horizontal axis via the at least one friction hinge such that the pivotable support arm has a range of motion between a horizontal position abutting the recessed portion and a terminal rotation position, wherein, when the base member is in the deployed state, the stowable tablet holder apparatus is configured to hold the tablet at any of various viewing angles by rotation of the pivotable support arm to a desired position such that the bottom edge of the tablet rests on the recessed portion and against the front lip portion and a back of the tablet rests against a portion the pivotable support arm.

4. The system of claim 3, wherein the pivotable support arm has a curved front surface, wherein the pivotable support arm extends from the front of the rear portion toward the curved front surface, wherein when the base member is horizontally positioned in the stowed state, a bottom edge of the curved front surface is closer to the rear portion than a top edge of the curved front surface, wherein, when the base member is in the deployed state, the stowable tablet holder apparatus is configured to hold a tablet at any of various viewing angles by rotation of the pivotable support arm to the desired position such that the bottom edge of the tablet rests on the recessed portion and against the front lip portion and the back of the tablet rests against a portion of the curved front surface of the pivotable support arm.

5. The system of claim 4, wherein an angle between a top surface of the recessed portion and a rear surface of the front lip portion is acute to accommodate a bottom edge of a tilted tablet.

6. The system of claim 4, wherein each of the at least one friction hinge has a pin connecting the pivotable support arm to the rear portion.

7. The system of claim 4, wherein when the pivotable support arm abuts the recessed portion, a top surface of the pivotable support arm is flat and a bottom surface of the pivotable support arm is flat.

8. The system of claim 1, wherein structure includes an inflight entertainment (IFE) display, wherein the stowable tablet holder apparatus is installed below the IFE display.

9. The system of claim 8, wherein structure is a wall of a passenger suite, wherein the wall faces a passenger seat.

10. The system of claim 1, wherein the stowable tablet holder apparatus is manually deployable and stowable.

11. The system of claim 10, wherein the stowable tablet holder apparatus is manually deployable and stowable by a pressing against a front of the front lip portion.

12. The system of claim 10, wherein the stowable tablet holder apparatus is manually deployable and stowable by a pulling a front of the front lip portion.

13. The system of claim 1, wherein the stowable tablet holder apparatus is motorized to move the base member between the stowed state and the deployed state.

14. The system of claim 13, further comprising a button configured to activate a motorized action of the stowable tablet holder apparatus.

15. The system of claim 1, wherein a bottom surface of the base member is flat.

16. The system of claim 1, wherein the pivotable support arm has at least a 90-degree range of motion.

17. The system of claim 1, wherein the pivotable support arm has at least a 100-degree range of motion.

18. The system of claim 1, wherein the pivotable support arm has less than a 90-degree range of motion.

* * * * *